(12) United States Patent
Earl et al.

(10) Patent No.: US 9,858,640 B1
(45) Date of Patent: Jan. 2, 2018

(54) DEVICE AND METHOD FOR MERGING 3D POINT CLOUDS FROM SPARSELY DISTRIBUTED VIEWPOINTS

(71) Applicant: HRL Laboratories, LLC, Malibu, CA (US)

(72) Inventors: Darren J. Earl, Los Angeles, CA (US); Heiko Hoffmann, Simi Valley, CA (US); Ryan M. Uhlenbrock, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 181 days.

(21) Appl. No.: 14/800,078

(22) Filed: Jul. 15, 2015

(51) Int. Cl.
*G06K 9/32* (2006.01)
*G06T 3/00* (2006.01)
(Continued)

(52) U.S. Cl.
CPC .......... *G06T 3/0075* (2013.01); *G06T 7/0032* (2013.01); *G06T 11/60* (2013.01);
(Continued)

(58) Field of Classification Search
None
See application file for complete search history.

(56) References Cited

U.S. PATENT DOCUMENTS

| 5,644,689 A | * | 7/1997 | Ban | G06T 15/10 345/424 |
| 6,330,523 B1 | * | 12/2001 | Kacyra | G01B 11/002 250/336.1 |

(Continued)

OTHER PUBLICATIONS

Kinect fusion—Camera, Izadi et al, Microsoft research, ACM, 978-1-4503-0716-1,2011, pp. 1-10.*

(Continued)

*Primary Examiner* — Jayesh A Patel
(74) *Attorney, Agent, or Firm* — Ladas & Parry

(57) ABSTRACT

A method for merging 3D point clouds from sparsely distributed viewpoints includes collecting a plurality of 3D point cloud data sets using a 3D sensor, each 3D point cloud data set in a local reference frame of a viewpoint of the 3D sensor, downsampling the 3D point cloud data sets, registering the downsampled 3D point cloud data sets to a global reference frame using an initial transform $T_v$ for rotating and translating each downsampled 3D point cloud data set from the local reference frame to the global reference frame, deriving estimated transforms $T_v$ until the last derived transform $T_v$ converges to a stable transform $T_v$, registering the plurality of 3D point cloud data sets to the global reference frame using the stable transform $T_v$, and deriving second estimated transforms $T_v$ until the last derived transform $T_v$ converges to a second stable transform $T_v$.

22 Claims, 2 Drawing Sheets

(51) Int. Cl.
  *G06T 11/60*  (2006.01)
  *G06T 17/00*  (2006.01)
  *G06T 17/05*  (2011.01)
  *G06T 7/00*  (2017.01)
(52) U.S. Cl.
  CPC ............ *G06T 17/005* (2013.01); *G06T 17/05* (2013.01); *G06T 2200/04* (2013.01); *G06T 2207/10028* (2013.01)

(56) References Cited

U.S. PATENT DOCUMENTS

| | | | | |
|---|---|---|---|---|
| 8,054,762 | B2* | 11/2011 | Potkonjak | G01S 5/0226 370/254 |
| 8,363,930 | B1* | 1/2013 | Francis, Jr. | G06K 9/00214 382/154 |
| 8,442,304 | B2* | 5/2013 | Marrion | G06K 9/00214 382/154 |
| 8,488,877 | B1* | 7/2013 | Owechko | G06K 9/00201 382/103 |
| 8,948,501 | B1* | 2/2015 | Kim | G01S 7/4808 345/419 |
| 9,053,547 | B2* | 6/2015 | Kitamura | G01B 11/24 |
| 2015/0015602 | A1* | 1/2015 | Beaudoin | G06T 7/0004 345/619 |
| 2015/0092514 | A1* | 4/2015 | Kiyose | B06B 1/0629 367/7 |
| 2015/0254857 | A1* | 9/2015 | Huang | G06F 19/3406 382/154 |

OTHER PUBLICATIONS

Besl et al., "A method for registration of 3-D shapes," Pattern Analysis and Machine Intelligence, IEEE Transactions on , vol. 14, No. 2, pp. 1-16 1992.

Ce et al., "A Fast Multi-Resolution Iterative Closest Point Algorithm," Pattern Recognition (CCPR), 2010 Chinese Conference on , vol., No., pp. 1,5, Oct. 21-23, 2010.

Chen et al., "Object Modeling by registration of multiple range images." Image and Vision Computing, 10(3):145-155, Apr. 1992.

Gagnon et al., "Registration of multiple range views for automatic 3-D model building," Computer Vision and Pattern Recognition, 1994. Proceedings CVPR '94., 1994 IEEE Computer Society Conference on , vol., No., pp. 581,586, Jun. 21-23, 1994.

Horn et al., "Closed-form solution of absolute orientation using unit quaternion," J. Opt. Soc. Amer., vol. A-4, pp. 629-642, 1987.

Izadi et al., "KinectFusion: Real-time 3D Reconstruction and Interaction Using a Moving Depth Camera," ACM Symposium on User Interface Software and Technology, pp. 1-10 (Oct. 2011).

Jost et al., "A multi-resolution ICP with heuristic closest point search for fast and robust 3D registration of range images," 3-D Digital Imaging and Modeling, 203. 3DIM 2003. Proceedings. Fourth International Conference on , vol., No., pp. 427,433, Oct. 6-10, 2003.

Leach "Improving Worst-case Delaunay Triangulation Algorithms." 4th Canadian Conference on Computational Geometry, pp. 1-7 (1992).

Pulli "Multiview registration for large data sets," Second International Conference of 3-D Digital Imaging and Modeling, 1999, pp. 160-168.

Salvi et al., "A review of recent range image registration methods with accuracy evaluation." Image Vision Comput. 25, 5 (May 2007), pp. 578-596.

Turk et al., "Zippered Polygon Meshes from Range Images," Proc. SIGGRAPH '94 (Orlando, Florida, Jul. 24-29, 1994). In Computer Graphics Proceedings, Annual Conference Series, 1994, ACM SIGGRAPH, pp. 311-318.

\* cited by examiner

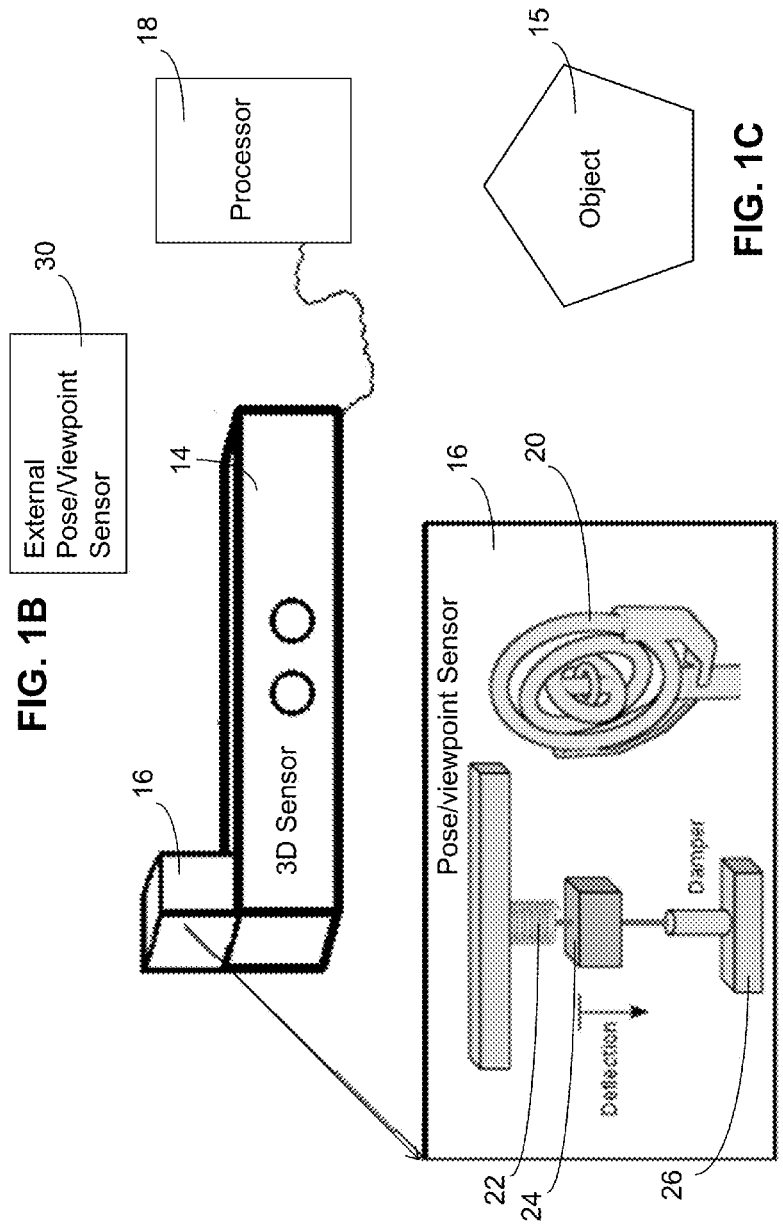

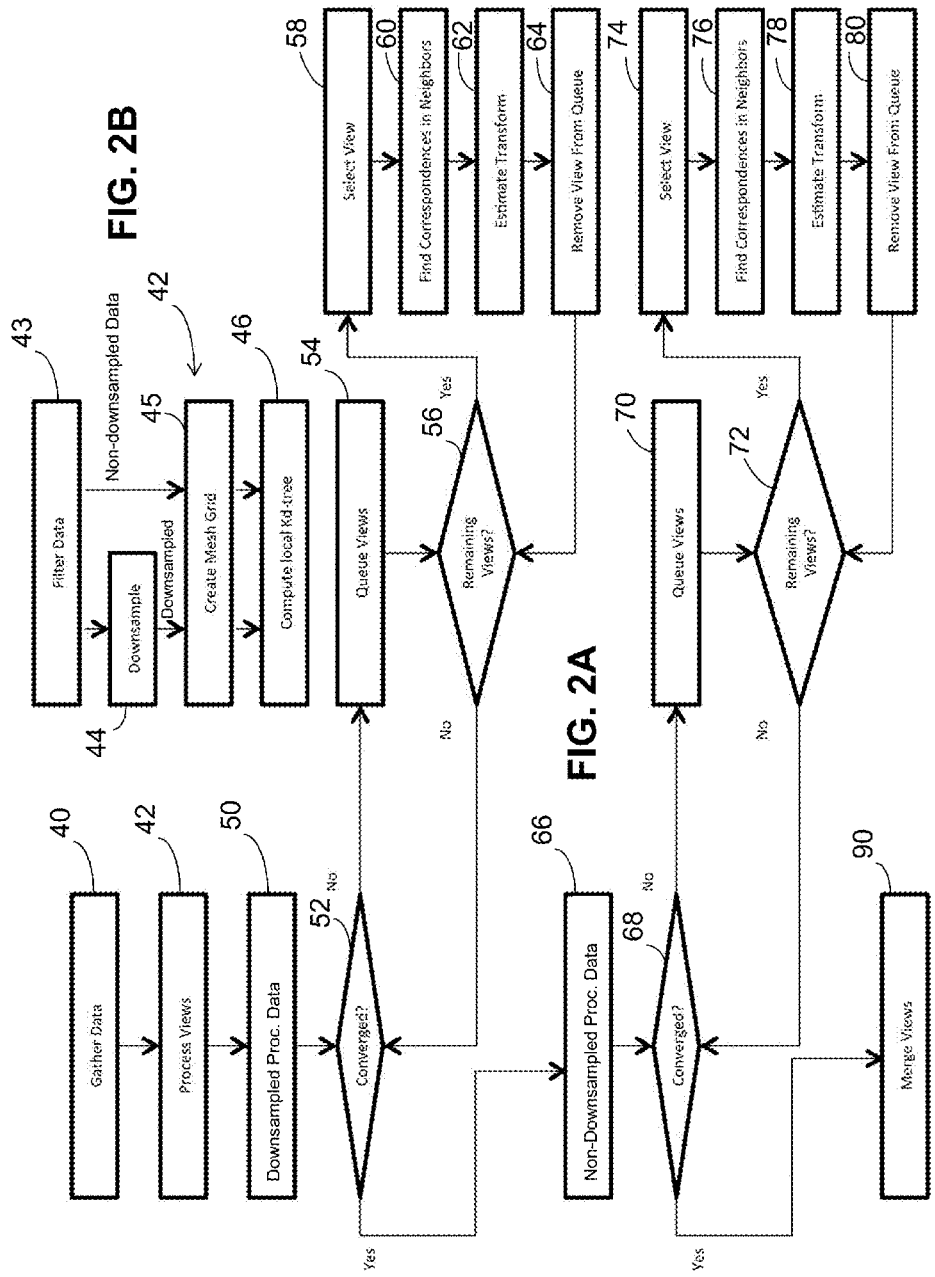

DEVICE AND METHOD FOR MERGING 3D POINT CLOUDS FROM SPARSELY DISTRIBUTED VIEWPOINTS

STATEMENT REGARDING FEDERAL FUNDING

This invention was made under U.S. Government contract D12PC00385. The U.S. Government has certain rights in this invention.

CROSS REFERENCE TO RELATED APPLICATIONS

None.

TECHNICAL FIELD

This disclosure relates to a device and methods for merging three dimensional (3D) point clouds taken from different viewpoints.

BACKGROUND

It is desirable to be able to recover geometric information of a scene from images taken from several viewpoints. In the prior art, the methods for recovering the geometric information of a scene require a device to record several hundred viewpoints in sequence, as described in Reference [3] below, which is incorporated herein by reference. Another prior art method requires precisely calibrated environments with the motion of the recording device or object structured, as described in References [4] and [7] below, which are incorporated herein by reference. Another prior art method relies on a coarse global model, as described in Reference [11] below, which is incorporated herein by reference.

The prior art method described by Reference [4] uses an early point-to-plane variant of the Iterative Closest Point algorithm in which one viewpoint is selected as the global frame of reference, and for all other viewpoints, points are transformed from a local reference frame into the frames of reference of neighboring views, correspondences are calculated, and a correction to the global location is calculated. This prior art, however, registers range data only from well controlled and calibrated scene-objects placed on a turntable and range data is taken at known and precise angles. What is needed is to be able to gather range data in less controlled and more flexible environments.

Pair-wise multi-view methods attempt to use constraints computed via traditional Iterative Closest Point algorithms to inform a global registration. The method described in Reference [3], which is incorporated herein by reference, iteratively registers a new view to a point cloud and then inserts the transformed points into the cloud; however this method suffers from an accumulation error.

Similarly, KinectFusion, as described in Reference [6] below, which is incorporated herein by reference, constructs a global voxel representation of the scene and iteratively integrates new sensor readings. This requires a high frame rate of sensor information (15-30 hz), slow movement of the sensor, and a priori restrictions on the resolution and scene volume. Another method, as described in Reference [9] below, which is incorporated herein by reference, assumes that pair-wise Iterative Closest Point provides the best transform between two views. Pair-wise Iterative Closest Point requires substantial overlap between two views, and this method cannot deal with large holes in point clouds. Furthermore, the calculated relative transform between pair-wise registered views can be biased towards large sections of points outside the viewing cone of one of the views.

Reference [11] below, which is incorporated herein by reference, describes triangulating the range data by connecting adjacent points. This method requires that all points be ordered in a two dimensional (2D) depth array; thus, holes in the 3D point cloud result in spurious boundary points.

In the survey paper of Reference [10] below, which is incorporated herein by reference, there is no multi-view registration method utilizing Kd-trees to speed up the nearest neighbor search, and prior art software libraries concerned with point cloud registration, namely Point Cloud Library, do not contain any implementation of multi-view-point registration.

REFERENCES

The following references are incorporated herein by reference.

[1] Besl, P. J.; McKay, Neil D., "A method for registration of 3-D shapes," *Pattern Analysis and Machine Intelligence, IEEE Transactions on*, vol. 14, no. 2, pp. 239, 256, February 1992.

[2] Ce Li; Jianru Xue; Shaoyi Du; Nanning Zheng, "A Fast Multi-Resolution Iterative Closest Point Algorithm," *Pattern Recognition (CCPR), 2010 Chinese Conference on*, vol., no., pp. 1, 5, 21-23 Oct. 2010.

[3] Chen, Y.; Medioni, G. "Object Modeling by registration of multiple range images." Image and Vision Computing, 10(3):145-155, April 1992.

[4] Gagnon, H.; Soucy, M.; Bergevin, R.; Laurendeau, D., "Registration of multiple range views for automatic 3-D model building," *Computer Vision and Pattern Recognition*, 1994. Proceedings CVPR '94, 1994 IEEE Computer Society Conference on, vol., no., pp. 581, 586, 21-23 Jun. 1994.

[5] Horn, B. K. P. "Closed-form solution of absolute orientation using unit quaternion," J. Opt. Soc. Amer., vol. A-4, pp. 629-642, 1987.

[6] Izadi, S., Kim, D., et all "KinectFusion: Real-time 3D Reconstruction and Interaction Using a Moving Depth Camera," ACM Symposium on User Interface Software and Technology. (October 2011).

[7] Jost, T.; Hugli, H., "A multi-resolution ICP with heuristic closest point search for fast and robust 3D registration of range images," 3-*D Digital Imaging and Modeling*, 2003. 3*DIM* 2003. Proceedings. Fourth International Conference on, vol., no., pp. 427, 433, 6-10 Oct. 2003.

[8] Leach, G. "Improving Worst-case Delaunay Triangulation Algorithms." 4$^{th}$ Canadian Conference on Computational Geometry (1992).

[9] Pulli, K. "Multiview registration for large data sets," Second International Conference of 3-D Digital Imaging and Modeling, 1999, pp. 160-168.

[10] Salvi, J; Matabosch, C.; Fofi, D.; Forest, J. 2007. "A review of recent range image registration methods with accuracy evaluation." *Image Vision Comput.* 25, 5 (May 2007), 578-596.

[11] Turk, G; Levoy M., "Zippered Polygon Meshes from Range Images," Proc. SIGGRAPH '94 (Orlando, Fla., Jul. 24-29, 1994). In *Computer Graphics Proceedings*, Annual Conference Series, 1994, ACM SIGGRAPH, pp. 311-318.

What is needed is a device and method for recovering geometric information of a scene taken from several viewpoints with only a coarse understanding of the relative positioning of the viewpoints. The embodiments of the present disclosure address these and other needs.

SUMMARY

In a first embodiment disclosed herein, a method for merging 3D point clouds from sparsely distributed viewpoints comprises collecting a plurality of three dimensional (3D) point cloud data sets using a 3D sensor, each 3D point cloud data sets in a local reference frame of a viewpoint of the 3D sensor, downsampling the three dimensional (3D) point cloud data sets to form a plurality of downsampled three dimensional (3D) point cloud data sets, registering the downsampled 3D point cloud data sets to a global reference frame by computing an initial transform $T_v$ for rotating and translating each downsampled 3D point cloud data set from the local reference frame of the viewpoint of the downsampled 3D point cloud data set to the global reference frame, finding for each downsampled 3D point cloud data set corresponding points in other neighboring downsampled 3D point cloud data sets, mapping the corresponding points to the global reference frame using the initial transform $T_v$, generating a list of each point in each downsampled 3D point cloud data set and corresponding points, deriving an estimated transform $T_v$ that optimally maps each point in each downsampled 3D point cloud data set onto the corresponding points, and repeating the steps of finding, mapping, generating, and deriving for each downsampled 3D point cloud data set using the last derived transform $T_v$ until the last derived transform $T_v$ converges to a stable transform $T_v$, and registering the plurality of three dimensional (3D) point cloud data sets to the global reference frame by using the stable transform $T_v$ for rotating and translating each 3D point cloud data set from the local reference frame of the viewpoint of the 3D point cloud data set to the global reference frame, finding for each 3D point cloud data set corresponding points in other neighboring 3D point cloud data sets, mapping the corresponding points to the global reference frame using the stable transform $T_v$, generating a list of each point in each 3D point cloud data set and corresponding points, deriving a second estimated transform $T_v$ that optimally maps each point in each 3D point cloud data set onto the corresponding points, and repeating the steps of finding, mapping, generating, and deriving for each 3D point cloud data set using the last derived second transform $T_v$ until the last derived second transform $T_v$ converges to a stable transform $T_v$.

In another embodiment disclosed herein, a method for merging 3D point clouds from sparsely distributed viewpoints comprises collecting a plurality of three dimensional (3D) point cloud data sets using a 3D sensor, each 3D point cloud data sets in a local reference frame of a viewpoint of the 3D sensor, downsampling the three dimensional (3D) point cloud data sets to form a plurality of downsampled three dimensional (3D) point cloud data sets, registering the downsampled 3D point cloud data sets to a global reference frame by computing an initial transform $T_v$ for rotating and translating each downsampled 3D point cloud data set from the local reference frame of the viewpoint of the downsampled 3D point cloud data set to the global reference frame, repeating registering the downsampled 3D point cloud data sets to a global reference frame by deriving an estimated transform $T_v$ that optimally maps each point in each downsampled 3D point cloud data set onto the global reference frame until the last derived transform $T_v$ converges to a stable transform $T_v$, and registering the plurality of three dimensional (3D) point cloud data sets to the global reference frame by using the stable transform $T_v$ for rotating and translating each 3D point cloud data set from the local reference frame of the viewpoint of the 3D point cloud data set to the global reference frame, and repeating registering the 3D point cloud data sets to a global reference frame by deriving a second estimated transform $T_v$ that optimally maps each point in each 3D point cloud data set onto the global reference frame until the last derived transform $T_v$ converges to a second stable transform $T_v$.

In a yet another embodiment disclosed herein, a method for merging 3D point clouds from sparsely distributed viewpoints comprises collecting a plurality of 3D point cloud data sets using a 3D sensor, each 3D point cloud data set in a local reference frame of a viewpoint of the 3D sensor, downsampling the 3D point cloud data sets to form downsampled 3D point cloud data sets, registering the downsampled 3D point cloud data sets to a global reference frame using an initial transform $T_v$ for rotating and translating each downsampled 3D point cloud data set from the local reference frame to the global reference frame, deriving estimated transforms $T_v$ until the last derived transform $T_v$ converges to a stable transform $T_v$, registering the plurality of 3D point cloud data sets to the global reference frame using the stable transform $T_v$, and deriving second estimated transforms $T_v$ until the last derived transform $T_v$ converges to a second stable transform $T_v$.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 1A and 1B show an apparatus for merging 3D point clouds from sparsely distributed viewpoints of an object, shown in FIG. 1C, in accordance with the present disclosure; and FIGS. 2A and 2B show a process flow for merging 3D point clouds from sparsely distributed viewpoints in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a method of registering a set of range data taken from multiple viewpoints using a device that records range data and maintains an estimate of its pose at the viewpoints where the data is recorded. With this registration, the point clouds from each viewpoint can be stitched together into a 3D model. The method of the present disclosure organizes the 3D points of each view into a search tree, computes a triangulation of these points to find boundary points, and determines correspondences between point clouds while ignoring boundary points. The method described starts with data collection and ends with the reconstruction of a 3D scene/model.

The present disclosure improves upon and generalizes the work described in Reference [4] above, which is incorporated herein by reference, by introducing a static global frame that allows all data sets to be treated identically and independently. Techniques are adapted from pair-wise iterative closest point algorithms. The present disclosure implements Kd-tree or other structures of the range data to speed up the search for correspondences between different sets of range data points. In addition the present disclosure implements a multi-resolution iterative closest point approach. Multi-resolution iterative closest point has previously been recognized as improving the speed of convergence in References [2], [6] and [9] above, which are incorporated herein by reference, in the context of multi-view registration. The method of the present disclosure also avoids convergence to a local minima and thereby provides a robust method for merging 3D point clouds. The method of the present disclosure uses a point-to-point variation of iterative closest point, because it has been demonstrated to provide a greater numeric stability than the point-to-plane method widely used in pair-wise iterative closest point. The method of the present disclosure includes boundary point exclusion, which reduces bias in iterative closest point convergence described in Reference [11] above, which is incorporated herein by reference. The present disclosure includes a general method for identifying boundary points on the range data and allows the range data to be modified by sampling and filtering.

The method of the present disclosure recovers geometric information of a scene taken from several viewpoints with only a coarse understanding of the relative positioning of the viewpoints, which is especially useful for tasks where data collection can be difficult and thereby only several or tens of partial views of the scene can be generated. The method of the present disclosure is robust in terms of errors in the initial estimation of the relative positioning of the viewpoints.

FIG. 1A shows a system for implementing the method for merging 3D point clouds from sparsely distributed viewpoints. The system includes a 3D sensor 14 for sensing a three dimensional (3D) image of an object 15, such as the object 15 shown in FIG. 1C, a pose/viewpoint sensor 16, which may be attached to the 3D sensor 14 or an external pose/viewpoint sensor 30, as shown in FIG. 1B, to provide an estimate of the pose or viewpoint of the 3D sensor 14, and a processor 18, for processing data from the 3D sensor 14. The object 15 shown in FIG. 1C is an example only. Generally, an object in the present disclosure is considered to be a 3D object.

The 3D sensor 14 may be implemented using a laser range finder, a multitude of 2D optical cameras, or a 3D optical camera. Data from the 3D sensor 14 and from pose/viewpoint sensor 16 or external pose/viewpoint sensor 30 is processed by processor 18 to form a 3D data set of the object 15 from each pose or viewpoint. Multiple 3D sensors 14 may also be used. The 3D data sets of the object 15 from each pose or viewpoint are then merged to form a 3D model of the object 15.

The pose/viewpoint sensor 16 attached to the 3D sensor 14 may include an inertial sensor 20 and/or one or more accelerometers with springs 22, masses 24, and dampers 26 to estimate the pose of the 3D sensor 14. Alternatively an external pose/viewpoint sensor 30 that is not attached to the 3D sensor 14 may be used to track the movements of the 3D sensor 14 to estimate the poses/viewpoints of the 3D sensor 14. The pose of the 3D sensor 14 may also be determined by using predefined and measured viewpoints.

The processor 18 may be a microprocessor, a computer, an integrated circuit, or any other computational device well known in the art.

To construct a 3D model of the object 15, multiple point clouds in a reference frame of the 3D sensor 14 and the initial estimates of the pose of the 3D sensor 14 in a global frame of reference are collected. A point cloud is a set of data points in some coordinate system. In a three-dimensional coordinate system, these points may be defined in a frame of reference as X, Y, and Z coordinates. Each point in a point cloud may represent a point on an external surface of an object, such as object 15.

The computation of the 3D model consists of the following stages, which consist of steps, as shown in the process flow in FIGS. 2A and 2B.

In step 40, shown in FIG. 2A, 3D data from the 3D sensor 14 and pose data from the pose/viewpoint sensor 16 or external pose/viewpoint sensor 30 are gathered for multiple poses or viewpoints of the 3D sensor 14. Then in step 42 the gathered data for the multiple views are processed. The processing in step 42 is shown in more detail in FIG. 2B and includes steps 43, 44, 45 and 46.

Stage 1 includes filtering the data gathered in step 40 in step 43 in FIG. 2B, to remove redundant and isolated points from the collected data set for all poses or viewpoints. A non-limiting example of filtering data is using a bounding box to remove outliers and eliminating points within a tiny distance to a neighboring point. The filtered data is referred to below as a non-downsampled data sets.

Stage 2 includes creating a downsampled data set as shown in step 44 in FIG. 2B. For example, the 3D sensor data non-downsampled data may be downsampled so that the average distance to a nearest neighbor point in the downsampled data set is 10 times that of the original gathered data. Of course, the average distance to a nearest neighbor point may be greater or less than 10.

Stage 3 includes creating a mesh connectivity grid, as shown in step 45 in FIG. 2B, for each non-downsampled and downsampled data set. The points from a pose or viewpoint are projected onto a plane normal to the view of the sensor. Then, an efficient Delaunay triangulation, as described in Reference [8], which is incorporated by reference, is performed on the planar points. The Delaunay triangulation results in connections between points on the plane. This connectivity between points is then replicated for the 3D points in a pose or viewpoint using the one-to-one mapping between 2D and 3D points.

In Stage 4 points for each mesh connectivity grid are either removed, marked as interior points, or marked as boundary points. For each triangle in a mesh grid, if the triangle is significantly non-regular it is removed from the set. If a point is not connected to any remaining triangles, it is removed. If a point is connected to an edge that is only connected to one triangle, it is marked as a boundary point. All other points are marked as interior points.

Stage 5 includes creating a Kd-tree in step 46 in FIG. 2B for the non-downsampled and downsampled data for each pose or viewpoint with the points in the local reference frame of the pose or viewpoint for nearest neighbor search.

By creating the Kd-trees in the local reference frame of the viewpoints or poses, the Kd-trees do not need to be rebuilt when the points in the view change position in the global reference frame. Instead of using Kd-trees, other tree structures may be used including Quadtrees, Octtrees, R-trees, and B-trees.

Stage 6 includes registering the downsampled data until convergence, as shown in steps 52, 54, 56, 58, 60, 62 and 64 in FIG. 2A, using the pseudo code shown in Table 1, below. Step 52 takes the downsampled data 50 and initially computes the transform Tv for each viewpoint from the estimated position and pose of the viewpoint. The transform $T_v$ indicates how to rotate and translate each point cloud from each pose or viewpoint. Step 54 lists all viewpoints, and steps 56, 58, and 64 carry out the loop through all viewpoints, which is the "for each view V" line in the pseudo code of Table 1. For each view, step 60 finds for each point "Pv" corresponding points in neighboring views, the "view N connected to V" line in the pseudo code of Table 1. The corresponding points are mapped to the global reference frame, the "Qg=Tn*Qn" line in the pseudo code of Table 1. In the process, a list of points Pv and corresponding points Qg is generated, which is set "C" in the pseudo code of Table 1. Given this list, step 62 derives an estimated transform $T_v$ that optimally maps Pv onto the corresponding Qg. Here, the optimization is to minimize the sum of squared differences between Qg and Tv*Pv. A non-limiting example for computing such optimization is Horn's method, as shown in Table 1 and as described in Reference [5], which is incorporated by reference. This estimate of Tv improves the initial value of Tv. In the following, step 52 uses this improved value, and the process between steps 52 and 64 repeats until Tv converges to a stable value.

TABLE 1

Pseudo Code for Point Cloud Registration

Let $T_v$ be the transform from view V to the global reference frame
Let g denote the global reference frame.
Let $P_v$ be a point in the reference frame of view V.
while not converged do
  for each view V do
    let C = { }
    for all $P_v \in$ V do
      $P_g = T_v * P_v$
      for each view N connected to V do
        $P_n = T_n^{-1} * P_g$
        using the kd-tree of N, find a point $Q_n \in$ N that is nearest to $P_n$
        if $Q_n$ is not a boundary point then
          $Q_g = T_n * Q_n$
          $C = C \cup \{(Q_g, P_v)\}$
        end if
      end for
    end for
    find $T_v$ that minimizes the $\sum_{(d,s)\in C} \text{norm}(d - T_v * s)^2$ using Horn's method[5]
  end for
end while Stage 7 repeats the process described in stage 6 with the following two modifications: first, the non-downsampled data 66 is used instead of the downsampled data 50; and second, the process starts with the estimates of Tv obtained in stage 6. Steps 68, 70, 72, 74, 76, 78, and 80 in FIG. 2A correspond to steps 52, 54, 56, 58, 60, 62 and 64 above. Using the non-downsampled data, stage 7 obtains a more accurate estimate of the transformation matrices Tv.

The registration in Stage 6 using the downsampled data sets increases the speed of the registration by reducing the number of iterations required in stage 7, and reduces local minima, which increases the robustness of convergence. A local minimum is a result, Tv, of minimizing the sum of squared differences, as described above, that is better than any small deviation of Tv, but which is not the globally optimal solution for Tv. The point-to-point variant of Iterative Closest Point is used as opposed to point-to-plane as it was demonstrated to be more robust to conflicting constraints in the transform update calculations.

Stage 8 includes combining and registering the registered point clouds for the non-downsampled data sets in step 90 in FIG. 2A using the transforms $T_v$ derived in steps 76 and 78. Duplicate points can be removed after merging the point clouds.

As described above, the apparatus and method for merging 3D point clouds from sparsely distributed viewpoints can be used to register a set of range data taken from multiple viewpoints. With this registration, the point clouds from each viewpoint can be stitched together into a 3D model.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:
1. A method for merging 3D point clouds from sparsely distributed viewpoints comprising:
    collecting a plurality of three dimensional (3D) point cloud data sets using a 3D sensor, each 3D point cloud data sets in a local reference frame of a viewpoint of the 3D sensor;
    downsampling the three dimensional (3D) point cloud data sets to form a plurality of downsampled three dimensional (3D) point cloud data sets;
    registering the downsampled 3D point cloud data sets to a global reference frame by
        computing an initial transform for rotating and translating each downsampled 3D point cloud data set from the local reference frame of the viewpoint of the downsampled 3D point cloud data set to the global reference frame;

finding for each downsampled 3D point cloud data set corresponding points in other neighboring downsampled 3D point cloud data sets;
mapping the corresponding points to the global reference frame using the initial transform;
generating a list of each point in each downsampled 3D point cloud data set and the corresponding points;
deriving an estimated transform that optimally maps each point in each downsampled 3D point cloud data set onto the corresponding points; and
repeating the steps of generating and deriving an estimated transform for each downsampled 3D point cloud data set using a last derived estimated transform until the last derived estimated transform converges to a stable transform; and
registering the plurality of three dimensional (3D) point cloud data sets to the global reference frame by:
using the stable transform for rotating and translating each 3D point cloud data set from the local reference frame of the viewpoint of the 3D point cloud data set to the global reference frame;
finding for each 3D point cloud data set corresponding points in other neighboring 3D point cloud data sets;
mapping the corresponding points to the global reference frame using the stable transform;
generating a list of each point in each 3D point cloud data set and the corresponding points;
deriving a second estimated transform that optimally maps each point in each 3D point cloud data set onto the corresponding points; and
repeating the steps of generating and deriving a second estimated transform for each 3D point cloud data set using a last derived second estimated transform until the last derived second estimated transform converges to a second stable transform.

2. The method of claim 1 further comprising:
collecting an estimate of the viewpoint of the 3D sensor for each 3D point cloud data set using a viewpoint sensor.

3. The method of claim 1 further comprising:
filtering each 3D point cloud data set to remove redundant and isolated points from the 3D point cloud data set.

4. The method of claim 1 further comprising:
creating a mesh connectivity grid for each 3D point cloud data set and for each downsampled 3D point cloud data set.

5. The method of claim 1 further comprising:
creating a search tree for each 3D point cloud data set and for each downsampled 3D point cloud data set in the local reference frame of the viewpoint.

6. The method of claim 5 wherein creating a search tree comprises:
creating a Kd-tree, a Quadtree, a Octtree, an R-tree, or a B-tree.

7. The method of claim 1 wherein the 3D sensor comprises a LASER range finder, a plurality of 2D optical cameras, a 3D camera, or a plurality of 3D sensors.

8. The method of claim 2 wherein the viewpoint sensor is attached to the 3D sensor.

9. The method of claim 2 wherein the viewpoint sensor comprises an inertial sensor or an accelerometer.

10. The method of claim 1 wherein downsampling the 3D point cloud data sets to form downsampled 3D point cloud data sets comprises:
downsampling so that an average distance to a nearest neighbor point is greater than an average distance to a nearest neighbor point of the 3D point cloud data sets.

11. The method of claim 4 wherein creating a mesh connectivity grid for each 3D point cloud data set and for each downsampled 3D point cloud data set comprises:
projecting points onto a plane normal to the viewpoint of the sensor;
using Delaunay triangulation to connect points on the plane; and
for each triangle of connected points in the mesh connectivity grid, if the triangle is significantly non-regular removing the points in the triangle, removing a point that is not connected to any remaining triangles, if a point is connected to an edge that is only connected to one triangle, marking the point as a boundary point, and marking all other points as interior points.

12. The method of claim 1 wherein deriving an estimated transform that optimally maps each point in each downsampled 3D point cloud data set onto the corresponding points comprises minimizing a sum of squared differences between the corresponding point and the estimated transform times each point in each downsampled 3D point cloud data set.

13. The method of claim 1 wherein deriving a second estimated transform that optimally maps each point in each 3D point cloud data set onto the corresponding points comprises minimizing a sum of squared differences between the corresponding point and the second estimated transform times each point in each 3D point cloud data set.

14. The method of claim 1 wherein deriving an estimated transform that optimally maps each point in each downsampled 3D point cloud data set onto the corresponding points comprises using Horn's method.

15. The method of claim 1 wherein deriving a second estimated transform that optimally maps each point in each 3D point cloud data set onto the corresponding points comprises using Horn's method.

16. The method of claim 1 wherein registering the downsampled 3D point cloud data sets to a global reference frame comprises using pseudo code

---

Let $T_v$ be the transform from view V to the global reference frame
Let g denote the global reference frame.
Let $P_v$ be a point in the reference frame of view V.
while not converged do
  for each view V do
    let C = { }
    for all $P_v \in V$ do
      $P_g = T_v * P_v$
      for each view N connected to V do
        $P_n = T_n^{-1} * P_g$
        using the kd-tree of N, find a point $Q_n \in N$ that is nearest to $P_n$
        if $Q_n$ is not a boundary point then
          $Q_g = T_n * Q_n$
          $C = C \cup \{(Q_g, P_v)\}$
        end if
      end for
    end for
    find $T_v$ that minimizes the $\sum_{(d,s) \in C} \text{norm}(d - T_v * s)^2$ using Horn's method[5]
  end for
end while

---

17. The method of claim 1 wherein registering the plurality of three dimensional (3D) point cloud data sets to the global reference frame comprises using pseudo code

---

Let $T_v$ be the transform from view V to the global reference frame
Let g denote the global reference frame.
Let $P_v$ be a point in the reference frame of view V.
while not converged do

```
for each view V do
  let C = { }
  for all P_v ∈ V do
    P_g = T_v * P_v
    for each view N connected to V do
      P_n = T_n^-1 * P_g
      using the kd-tree of N, find a point Q_n ∈ N that is nearest to P_n
      if Q_n is not a boundary point then
        Q_g = T_n * Q_n
        C = C ∪ {(Q_g, P_v)}
      end if
    end for
  end for
  find T_v that minimizes the  ∑        norm(d − T_v ∗ s)^2  using
                              (d,s)∈C
Horn's method[5]
  end for
end while.
```

18. A method for merging 3D point clouds from sparsely distributed viewpoints comprising:
  collecting a plurality of three dimensional (3D) point cloud data sets using a 3D sensor, each 3D point cloud data sets in a local reference frame of a viewpoint of the 3D sensor;
  downsampling the three dimensional (3D) point cloud data sets to form a plurality of downsampled three dimensional (3D) point cloud data sets;
  registering the downsampled 3D point cloud data sets to a global reference frame by:
  computing an initial transform for rotating and translating each downsampled 3D point cloud data set from the local reference frame of the viewpoint of the downsampled 3D point cloud data set to the global reference frame;
  repeating registering the downsampled 3D point cloud data sets to a global reference frame by repeatedly deriving an estimated transform that optimally maps each point in each downsampled 3D point cloud data set onto the global reference frame until a last derived estimated transform converges to a stable transform; and
  registering the plurality of three dimensional (3D) point cloud data sets to the global reference frame by using the stable transform for rotating and translating each 3D point cloud data set from the local reference frame of the viewpoint of the 3D point cloud data set to the global reference frame; and
  repeating registering the 3D point cloud data sets to a global reference frame by repeatedly deriving a second estimated transform that optimally maps each point in each 3D point cloud data set onto the global reference frame until a last derived second estimated transform converges to a second stable transform.

19. The method of claim 18 further comprising:
  collecting an estimate of the viewpoint of the 3D sensor for each 3D point cloud data set using a viewpoint sensor.

20. The method of claim 18 wherein registering the downsampled 3D point cloud data sets to a global reference frame comprises using pseudo code

```
Let T_v be the transform from view V to the global reference frame
Let g denote the global reference frame.
Let P_v be a point in the reference frame of view V.
while not converged do
```

21. The method of claim 18 wherein registering the plurality of three dimensional (3D) point cloud data sets to the global reference frame comprises using pseudo code

```
Let T_v be the transform from view V to the global reference frame
Let g denote the global reference frame.
Let P_v be a point in the reference frame of view V.
while not converged do
  for each view V do
    let C = { }
    for all P_v ∈ V do
      P_g = T_v * P_v
      for each view N connected to V do
        P_n = T_n^-1 * P_g
        using the kd-tree of N, find a point Q_n ∈ N that is nearest to P_n
        if Q_n is not a boundary point then
          Q_g = T_n * Q_n
          C = C ∪ {(Q_g, P_v)}
        end if
      end for
    end for
    find T_v that minimizes the  ∑        norm(d − T_v ∗ s)^2  using
                                (d,s)∈C
Horn's method[5]
    end for
end while.
```

22. A method for merging 3D point clouds from sparsely distributed viewpoints comprises:
  collecting a plurality of 3D point cloud data sets using a 3D sensor, each 3D point cloud data set in a local reference frame of a viewpoint of the 3D sensor;
  downsampling the 3D point cloud data sets to form downsampled 3D point cloud data sets;
  registering the downsampled 3D point cloud data sets to a global reference frame using an initial transform for rotating and translating each downsampled 3D point cloud data set from the local reference frame to the global reference frame;
  repeating registering the downsampled 3D point cloud data sets to the global reference frame by repeatedly deriving estimated transforms until a last derived estimated transform converges to a stable transform;
  registering the plurality of 3D point cloud data sets to the global reference frame using the stable transform; and
  repeating registering the 3D point cloud data sets to the global reference frame by repeatedly deriving second estimated transforms until a last derived estimated transform converges to a second stable transform.

* * * * *